US009838287B2

United States Patent
Zalmanovitch et al.

(10) Patent No.: US 9,838,287 B2
(45) Date of Patent: Dec. 5, 2017

(54) PREDICTING NETWORK DATA CONSUMPTION RELATIVE TO DATA USAGE PATTERNS

(71) Applicant: Microsoft Corporation, Redmond, WA (US)

(72) Inventors: Gil Zalmanovitch, Seattle, WA (US); Gregory James Scott, Seattle, WA (US); Shai Guday, Redmond, WA (US); Alec Garvin Kwok, Redmond, WA (US); Yue Jiang, Redmond, WA (US); Kenneth Vincent Ma, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 241 days.

(21) Appl. No.: 13/721,041

(22) Filed: Dec. 20, 2012

(65) Prior Publication Data

US 2013/0196617 A1    Aug. 1, 2013

Related U.S. Application Data

(60) Provisional application No. 61/696,472, filed on Sep. 4, 2012, provisional application No. 61/591,503, filed
(Continued)

(51) Int. Cl.
*H04M 11/00* (2006.01)
*H04L 12/26* (2006.01)
(Continued)

(52) U.S. Cl.
CPC ...... *H04L 43/0876* (2013.01); *H04L 12/1435* (2013.01); *H04L 43/04* (2013.01);
(Continued)

(58) Field of Classification Search
CPC ............ H04M 2215/32; H04M 15/00; H04M 2215/202; H04M 17/00; H04M 15/28; G06C 20/3206
(Continued)

(56) References Cited

U.S. PATENT DOCUMENTS 6,308,328 B1   10/2001   Bowcutt et al.
7,184,749 B2    2/2007   Marsh et al.
(Continued)

FOREIGN PATENT DOCUMENTS

WO    2008/097105 A1    8/2008
WO    2008/155444 A1   12/2008
(Continued)

OTHER PUBLICATIONS

Blass, "Exclusive: Windows Phone 8 Detailed", Retrieved from <<http://pocketnow.com/windows-phone/exclusive-windows-phone-8-detailed>>, Feb. 2, 2012, pp. 2.
(Continued)

*Primary Examiner* — Amancio Gonzalez

(57) ABSTRACT

Embodiments provide interactive prediction of network data consumption. Current data usage statistics are compared with a data usage plan. The current data usage statistics represent network data consumed by at least one computing device of the user. The network data is consumed during at least a portion of a pre-defined time interval of a data usage plan. For the given time interval, one of a plurality of pre-defined data usage states is assigned to the user, such as On Track, Off Track, Over Limit, and Under Track. In some embodiments, the user interacts with the data usage pattern to dynamically adjust for expected future use, which may change the currently assigned data usage state.

20 Claims, 6 Drawing Sheets

Related U.S. Application Data on Jan. 27, 2012, provisional application No. 61/591,509, filed on Jan. 27, 2012.

(51) Int. Cl.

| | |
|---|---|
| *H04W 4/26* | (2009.01) |
| *H04W 24/02* | (2009.01) |
| *H04M 15/00* | (2006.01) |
| *H04L 12/14* | (2006.01) |
| *H04W 4/24* | (2009.01) |
| *H04W 4/00* | (2009.01) |
| *H04W 8/18* | (2009.01) |
| *H04M 1/725* | (2006.01) |
| *H04W 88/06* | (2009.01) |

(52) U.S. Cl.
CPC .......... *H04L 43/045* (2013.01); *H04L 43/062* (2013.01); *H04M 15/41* (2013.01); *H04M 15/58* (2013.01); *H04M 15/60* (2013.01); *H04M 15/765* (2013.01); *H04M 15/7652* (2013.01); *H04M 15/80* (2013.01); *H04M 15/83* (2013.01); *H04M 15/84* (2013.01); *H04M 15/846* (2013.01); *H04M 15/85* (2013.01); *H04M 15/853* (2013.01); *H04M 15/854* (2013.01); *H04M 15/86* (2013.01); *H04W 4/003* (2013.01); *H04W 4/24* (2013.01); *H04W 4/26* (2013.01); *H04W 8/186* (2013.01); *H04W 24/02* (2013.01); *H04M 1/72522* (2013.01); *H04M 15/775* (2013.01); *H04M 15/8044* (2013.01); *H04M 15/856* (2013.01); *H04W 8/18* (2013.01); *H04W 88/06* (2013.01)

(58) Field of Classification Search
USPC .................................................. 455/405–409
See application file for complete search history.

(56) References Cited

U.S. PATENT DOCUMENTS

| | | | |
|---|---|---|---|
| 7,277,938 B2 | 10/2007 | Duimovich et al. | |
| 7,320,131 B1 | 1/2008 | O'Toole, Jr. | |
| 7,406,596 B2 | 7/2008 | Tararukhina et al. | |
| 7,418,532 B2 | 8/2008 | Suzuki et al. | |
| 7,532,571 B1 | 5/2009 | Price et al. | |
| 7,720,727 B2 | 5/2010 | Keyes et al. | |
| 7,904,080 B2 | 3/2011 | Atkins et al. | |
| 7,986,935 B1 | 7/2011 | D'souza et al. | |
| 8,064,876 B2 | 11/2011 | Knight | |
| 8,359,389 B1 | 1/2013 | Cohen et al. | |
| 8,484,568 B2 | 7/2013 | Rados et al. | |
| 2002/0029273 A1 | 3/2002 | Haroldson et al. | |
| 2002/0082991 A1 | 6/2002 | Friedman et al. | |
| 2003/0066055 A1* | 4/2003 | Spivey ........................ | 717/131 |
| 2003/0115385 A1 | 6/2003 | Adamane et al. | |
| 2003/0186706 A1 | 10/2003 | Bergins et al. | |
| 2004/0111712 A1 | 6/2004 | Humpert et al. | |
| 2004/0153587 A1 | 8/2004 | Choi | |
| 2004/0176965 A1 | 9/2004 | Winch et al. | |
| 2004/0199634 A1 | 10/2004 | Jackowski et al. | |
| 2006/0141983 A1 | 6/2006 | Jagannathan et al. | |
| 2006/0211404 A1 | 9/2006 | Cromp et al. | |
| 2007/0211674 A1 | 9/2007 | Ragnar Karlberg et al. | |
| 2007/0294562 A1 | 12/2007 | Takamatsu et al. | |
| 2008/0318621 A1 | 12/2008 | Fan et al. | |
| 2009/0054030 A1 | 2/2009 | Golds | |
| 2009/0068980 A1 | 3/2009 | Creswell et al. | |
| 2009/0068984 A1 | 3/2009 | Burnett | |
| 2009/0138427 A1 | 5/2009 | Kalavade | |
| 2009/0172275 A1 | 7/2009 | Nochimowski et al. | |
| 2009/0196302 A1 | 8/2009 | Pastorino et al. | |
| 2009/0199196 A1 | 8/2009 | Peracha | |
| 2009/0203352 A1 | 8/2009 | Fordon et al. | |
| 2009/0285201 A1 | 11/2009 | Ben-haim et al. | |
| 2010/0015926 A1 | 1/2010 | Luff | |
| 2010/0017506 A1 | 1/2010 | Fadell | |
| 2010/0035576 A1 | 2/2010 | Jones et al. | |
| 2010/0130163 A1 | 5/2010 | Pousti | |
| 2010/0180190 A1 | 7/2010 | Carroll | |
| 2010/0191612 A1 | 7/2010 | Raleigh | |
| 2010/0318647 A1 | 12/2010 | Savoor et al. | |
| 2011/0019566 A1 | 1/2011 | Leemet et al. | |
| 2011/0047620 A1 | 2/2011 | Mahaffey et al. | |
| 2011/0087985 A1* | 4/2011 | Buchanan et al. ............ | 715/771 |
| 2011/0137776 A1 | 6/2011 | Goad et al. | |
| 2011/0145920 A1 | 6/2011 | Mahaffey et al. | |
| 2011/0151831 A1 | 6/2011 | Pattabiraman | |
| 2011/0176482 A1 | 7/2011 | Vizor et al. | |
| 2011/0211465 A1 | 9/2011 | Farrugia et al. | |
| 2011/0231551 A1 | 9/2011 | Hassan et al. | |
| 2011/0238826 A1 | 9/2011 | Carre et al. | |
| 2011/0244826 A1 | 10/2011 | Krishnan et al. | |
| 2011/0275344 A1 | 11/2011 | Momtahan et al. | |
| 2011/0276442 A1 | 11/2011 | Momtahan et al. | |
| 2011/0300865 A1 | 12/2011 | Kashikar et al. | |
| 2012/0054661 A1 | 3/2012 | Rados et al. | |
| 2012/0101952 A1* | 4/2012 | Raleigh et al. ............... | 705/304 |
| 2012/0142310 A1 | 6/2012 | Pugh et al. | |
| 2012/0155296 A1 | 6/2012 | Kashanian | |
| 2012/0158947 A1 | 6/2012 | Hassan et al. | |
| 2012/0163232 A1 | 6/2012 | Yoo | |
| 2012/0198046 A1 | 8/2012 | Shah et al. | |
| 2012/0208495 A1 | 8/2012 | Lawson et al. | |
| 2012/0278194 A1 | 11/2012 | Dewan et al. | |
| 2012/0315872 A1* | 12/2012 | Amato et al. ................. | 455/408 |
| 2013/0023230 A9 | 1/2013 | Momtahan et al. | |
| 2013/0035059 A1* | 2/2013 | Liu ..................... | H04L 12/1403 455/406 |
| 2013/0054378 A1 | 2/2013 | Hao et al. | |
| 2013/0060653 A1 | 3/2013 | Sharkey | |
| 2013/0117846 A1* | 5/2013 | Mahaffey et al. .............. | 726/22 |
| 2013/0122882 A1 | 5/2013 | Patel et al. | |
| 2013/0149994 A1 | 6/2013 | Gaddam et al. | |

FOREIGN PATENT DOCUMENTS

| | | |
|---|---|---|
| WO | 2012/083285 A2 | 6/2012 |
| WO | 2012/162419 A2 | 11/2012 |

OTHER PUBLICATIONS

Sinofsky, "Engineering Windows 8 for Mobile Networks", Retrieved from <<http://blogs.msdn.com/b/b8/archive/2012/01/20/engineering-windows-8-for-mobility.aspx>>, Jan. 20, 2012, pp. 28.

"Non-Final Office Action Received in U.S. Appl. No. 13/721,029", dated Mar. 11, 2014, filed Dec. 20, 2012, 13 Pages.

"International Search Report & Written Opinion for PCT Patent Application No. PCT/US2013/022353", dated May 15, 2013, Filed Date: Jan. 21, 2013, 10 Pages.

Heikkinen, et al., "Measuring Mobile Peer-to-Peer Usage: Case Finland 2007", In Proceedings of the 10th International Conference on Passive and Active Network Measurement, Apr. 2009, pp. 165-174.

"Non-Final Office Action Received in U.S. Appl. No. 13/721,053", dated Mar. 18, 2014, filed Dec. 20, 2012, 8 Pages.

"International Search Report & Written Opinion for PCT Patent Application No. PCT/US2013/022822", dated Apr. 25, 2013, Filed Date: Jan. 24, 2013, 9 Pages.

Heinz II, Gerard J., "Priorities in Stream Transmission Control Protocol (SCTP) Multistreaming", A Thesis Submitted to the Faculty of the University of Delaware in Partial Fulfillment of the Requirements for the Degree of Master of Degree in Computer and Information Science, 2003, 35 Pages.

Peddemors, Arjan, "Network Resource Awareness and Prediction on Mobile Devices", Novay PhD Research Series, No. 026 (Novay/PRS/026), Oct. 2009, 236 Pages.

Balasubramanian, Aruna, "Architecting Protocols to Enable Mobile Applications in Diverse Wireless Networks", A Dissertation Sub-

(56) References Cited

OTHER PUBLICATIONS mitted to the Graduate School of the University of Massachusetts Amherst in Partial Fulfillment of the requirements for the Degree of Doctor of Philosophy, Feb. 2011, 198 Pages.

"Non-Final Office Action Received in U.S. Appl. No. 13/721,069", dated Mar. 14, 2014, filed Dec. 20, 2012, 14 Pages.

"Non-Final Office Action Received in U.S. Appl. No. 13/721,023", dated Mar. 28, 2014, filed Dec. 20, 2012, 15 Pages.

"Rapid Mobile Data Service Creation and Monetization", Retrieved at http://www.amdocs.com/Products/network-control/Documents/data-experience-solution-datasheet.pdf>>, 2012, 7 Pages.

Non-Final Office Action Received in U.S. Appl. No. 13/721,032, dated Feb. 6, 2014, filed Dec. 20, 2012, 10 Pages.

Unuth, Nadeem, "Data Usage Monitor Apps for Your iPhone and iPad", Retrieved Date: Oct. 8, 2012 Available at: http://voip.about.com/od/voipbandwidth/tp/Data-Usage-Monitor-Apps-For-Your-Iphone-And-Ipad.htm, 1 page.

"Non-Final Office Action Received in U.S. Appl. No. 13/721,058", dated Apr. 16, 2014, filed Dec. 20, 2012, 10 Pages.

"Final Office Action Received in U.S. Appl. No. 13/721,058", dated Sep. 22, 2014, filed Dec. 20, 2012, 15 Pages.

"Non-Final Office Action for U.S. Appl. No. 13/721,032", dated Aug. 5, 2014, filed Dec. 20, 2012, 16 Pages.

"Applicant Initiated Interview Summary for U.S. Appl. No. 13/721,053", dated May 30, 2014, filed Dec. 20, 2012, 3 pages.

"Examiner Initiated Interview Summary for U.S. Appl. No. 13/721,053", dated Aug. 19, 2014, filed Dec. 20, 2012, 2 pages.

Notice of Allowance for U.S. Appl. No. 13/721,053, dated Aug. 19, 2014, filed Dec. 20, 2012, 14 Pages.

"Final Office Action Received in U.S. Appl. No. 13/721,029", dated Oct. 1, 2014, filed Dec. 20, 2012, 19 Pages.

"Supplementary Search Report Issued in European Patent Application No. 13741434.8", dated Sep. 30, 2014, 3 Pages.

"Supplementary Search Report Issued in European Patent Application No. 13741633.5", dated Sep. 18, 2014, 3 Pages.

"DataMan Pro for iPad—Analyze your 3G Data Usage on Your Computer", Published on: Jul. 9, 2011, Available at: http://prmac.com/release-id-27794.htm, 2 pages.

"Mobile Data Usage Meter—Manage Mobile Data Usage & Wireless Broadband Devices", Published on: Dec. 28, 2009, Available at: http://web.archive.org/web/20091228092436/http://www.telstrabusiness.com/business/portal/online/site/myaccount/mobiledatausagemeter.94003, 2 pages.

"My Data Usage Pro", Retrieved on: Dec. 12, 2014, Available at: http://download.cnet.com/My-Data-Usage-Pro/3000-2094_4-75402502.html, 3 pages.

Rhee, Ed, "How to Track Data Usage on your Android Phone", Published on: Jul. 8, 2011, Available at: http://www.cnet.com/how-to/how-to-track-data-usage-on-your-android-phone/, 4 pages.

"Final Office Action Issued in U.S. Appl. No. 13/721,023", dated Oct. 27, 2014, 16 Pages.

"Non-Final Office Action Issued in U.S. Appl. No. 13/721,023", dated Feb. 13, 2015, 19 Pages.

"Notice of Allowance Issued in U.S. Appl. No. 13/721,032", dated Jan. 30, 2015, 13 Pages.

"Notice of Allowance Issued in U.S. Appl. No. 13/721,053", dated Oct. 28, 2014, 7 Pages.

"Non-Final Office Action Issued in U.S. Appl. No. 13/721,058", dated Jan. 22, 2015, 13 Pages.

"Non-Final Office Action Issued in U.S. Appl. No. 13/721,066", dated Feb. 13, 2015, 17 Pages.

"Final Office Action Issued in U.S. Appl. No. 13/721,069", dated Nov. 28, 2014, 23 Pages.

"Office Action Issued in European Patent Application No. 13741434.8", dated Nov. 27, 2014, 6 Pages.

"Office Action Issued in European Patent Application No. 13741633.5", dated Nov. 27, 2014, 7 Pages.

* cited by examiner

ND DATA
PREDICTING NETWORK DATA CONSUMPTION RELATIVE TO DATA USAGE PATTERNS

CROSS-REFERENCE TO RELATED APPLICATIONS

This application claims the benefit of U.S. Provisional Application No. 61/696,472, filed Sep. 4, 2012, U.S. Provisional Application No. 61/591,503, filed Jan. 27, 2012, and U.S. Provisional Application No. 61/591,509, filed Jan. 27, 2012. The entirety of these provisional applications is hereby incorporated by reference herein.

This application is related to the following applications: U.S. Patent Application entitled "Tracking Data Usage Under a Schematized Data Usage Plan," U.S. Patent Application entitled "Managing Data Transfers Over Network Connections Based on Priority and a Data Usage Plan," U.S. Patent Application entitled "On-Device Attribution of Network Data Usage," U.S. Patent Application entitled "Updating Dynamic Data Usage Plans and Statistics," U.S. Patent Application entitled "Data Usage Profiles for Users and Applications," U.S. Patent Application entitled "Recommendations for Reducing Data Consumption Based on Data Usage Profiles," U.S. Patent Application entitled "Dynamically Adjusting a Data Usage Plan Based on Data Usage Statistics," and U.S. Patent Application entitled "Managing Network Data Transfers in View of Multiple Data Usage Plans." All of these applications are incorporated by reference herein in their entirety.

BACKGROUND

With the increased popularity of smart telephones, tablets, and other mobile devices, there has been a similar increase in the amount of data handled by the networks of mobile operators. To reduce the strain on network infrastructure and to reduce network transfer costs, mobile operators are shifting from offering simple unlimited mobile data plans to offering capped and metered plans. Some of these capped and metered plans are complex, with allotted data caps varying based on network type, time of day, etc. Further, the fees for exceeding the allotted data caps may be significant and may also vary based on network type, time of day, etc. The existing systems generally lack mechanisms to help the user understand and manage network data consumption and transfer costs in view of the data usage plans.

As a result, with the existing systems, users can unknowingly exceed the allotted data caps and experience bandwidth throttling (e.g., a reduction or limit placed upon the rate of consumption) and/or be presented with a much larger than normal monthly bill, resulting in "bill shock." Throttling and bill shock can impact the user experience, leading to dissatisfied customers, increased customer service calls, and negative impressions of the mobile operators.

SUMMARY

Embodiments of the disclosure assign data usage states to users based on data usage statistics and data usage patterns. Current data usage statistics for a user are accessed. The current data usage statistics represent network data consumed during at least a portion of a pre-defined time interval by at least one computing device of the user. The accessed current data usage statistics are compared to a data usage pattern associated with the user. One of a plurality of pre-defined data usage states are assigned to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
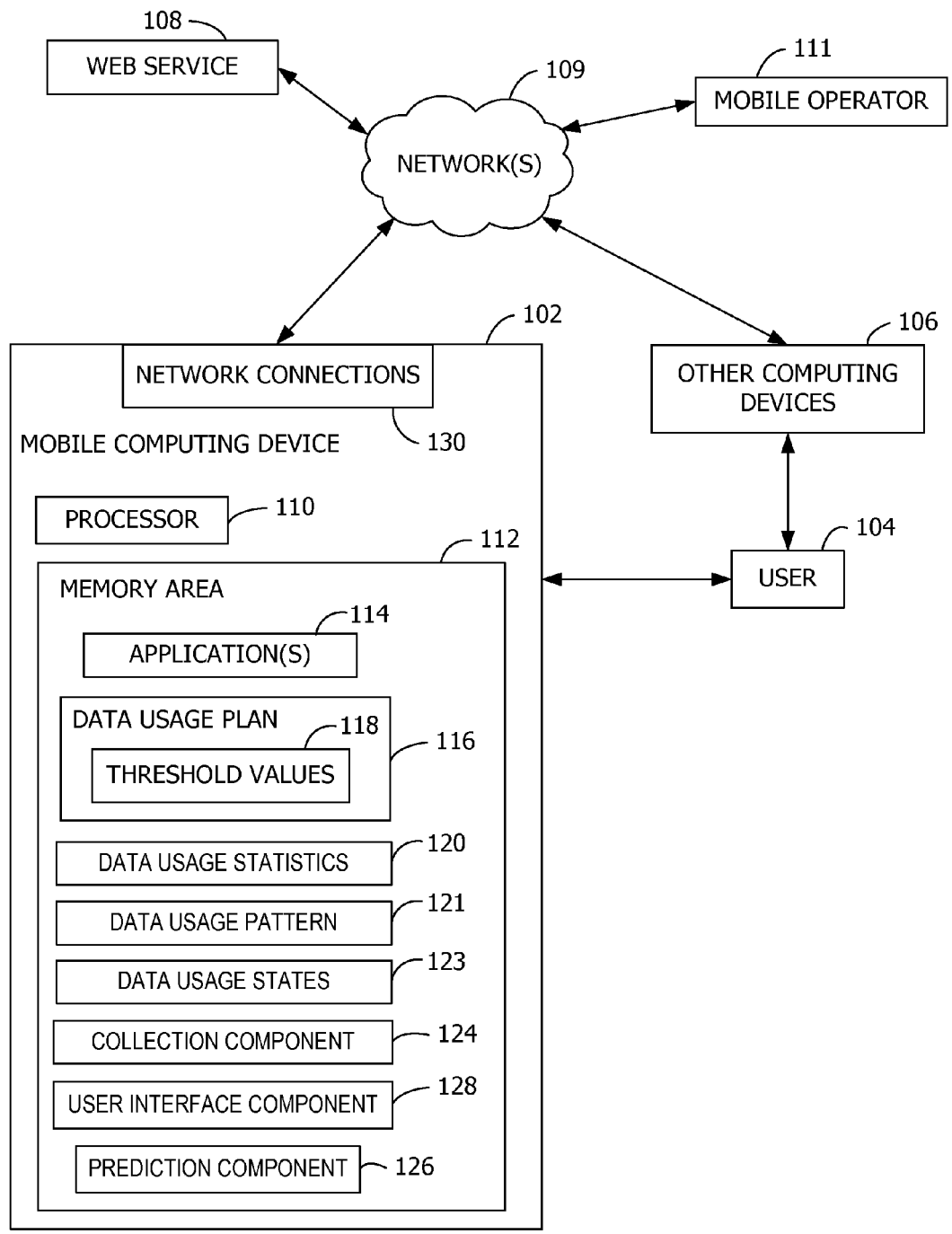
FIG. 1 is an exemplary block diagram illustrating a web service interacting with a mobile operator and user computing devices.

Referring to the figures, embodiments of the disclosure predict network data consumption under a data usage plan 116. The network data consumption is predicted relative to a data usage pattern 121 of a user 104. The data usage pattern 121 represents a pattern of historical network data consumption throughout a pre-defined time interval, such as a billing cycle. Based on a comparison of current data usage statistics 120 and the data usage pattern 121, data usage states 123 or progressions relative to allotted usage under the data usage plan 116 are assigned to the user 104. Exemplary data usage states 123 include, but are not limited to, On Track, Off Track, Over Limit, or Under Track. In some embodiments, the current data usage statistics 120 and the data usage pattern 121 are plotted in a graph for display to the user 104.

Aspects of the disclosure enable the user 104 to understand the progression of network data consumption throughout the billing cycle relative to historical network data consumption. Because the data usage state 123 may be selected and assigned numerous times throughout the billing cycle, the assigned data usage state 123 may change with time. A cumulative duration of time spent in each of the assigned data usage states 123 throughout the billing cycle may be calculated, as well as compared with data aggregated from other users 104.

In some embodiments, the data usage pattern 121 is displayed to the user 104 as an interactive curve. The user 104 may adjust portions of the data usage pattern 121 corresponding to future days in the billing cycle to dynamically adjust for expected future network data consumption. For example, the user 104 may plan to use an increased amount of cellular data and wants to know how this expected usage may affect cumulative consumption over the billing cycle. In some embodiments, the predicted network data consumption is calculated and translated into a financial cost for the user 104. For example, terms and conditions of the data usage plan 116 of the user 104 (e.g., the rate for excess data fees) are accessed to determine the financial cost of the predicted network data consumption.

Referring to FIG. 1, an exemplary block diagram illustrates a web service 108 interacting with the mobile operator 111 and user computing devices. The user computing devices include, for example, a mobile computing device 102 and other computing devices 106. The user computing devices communicate over one or more networks 109. In some embodiments, one or more of the user computing devices are associated with one of the data usage plans 116. The data usage plan 116 represents the terms and/or conditions (e.g., network data consumption allotment) under which the mobile operator 111 provides data transfer services to the user computing devices. For example, a plurality of the user computing devices may share network data consumption allotted under the same or common data usage plan 116.

The user computing devices include any device executing instructions (e.g., as application programs, operating system functionality, or both) to implement operations and functionality. The user computing devices may include, for example, the mobile computing device 102 or any other portable device. In some embodiments, the mobile computing device 102 includes a mobile telephone, laptop, tablet, computing pad, netbook, gaming device, e-reader, and/or portable media player. The other computing devices 106 may include less portable devices such as desktop personal computers, kiosks, and tabletop devices that have network connectivity capabilities. Additionally, each user computing device may represent a group of processing units. While aspects of the disclosure may be described herein with reference to the mobile computing device 102, the descriptions are applicable to any of the user computing devices.

Communication to/from the user computing devices may occur using any protocol or mechanism over one or more of the networks 109. The networks 109 represent any infrastructure or other means for sending and/or receiving data. The networks 109 may include wired and/or wireless networks.

One or more of the mobile operators 111 communicate with the web service 108 and/or the user computing devices via the network 109. Further, the user computing devices communicate with the web service 108, or other entity that performs the operations described herein as being associated with the web service 108. For example, some embodiments lack the centralized web service 108. As one such example, the application 114 created by the mobile operator 111 may be communicating with a billing system of the mobile operator 111 to generate data and provide the generated data to the mobile computing device 102 for consumption. In a further example, the application 114 and/or the billing system may mine the generated data for business intelligence, or send the generated data to another entity for business intelligence mining.

In some embodiments, the mobile computing device 102 and the other computing devices 106 are associated with a common data usage plan 116 of the user 104. For example, the mobile computing device 102 may represent a mobile telephone of the user 104, while the other computing devices 106 may include a tablet and a laptop associated with the user 104. In other embodiments, the mobile computing device 102 and each of the other computing devices 106 are associated with separate data usage plans 116.

In some embodiments, the centralized web service 108 interacts with the user computing devices and the mobile operators 111 to distribute the data usage plans 116 and to aggregate the data usage statistics 120. For example, the web service 108 receives a schema populated with data relating to the data usage plan 116 from the mobile operator 111 and distributes the populated schema to one or more of the user computing devices associated with the data usage plan 116.

The web service 108 may further generate, monitor, collect, and/or receive the data usage statistics 120 from the mobile operators 111 and from one or more of the user computing devices. The data usage statistics 120 represent an amount of network data consumed by the user computing devices under the data usage plan 116. In some embodiments, the web service 108 reconciles any differences in the data usage statistics 120 received from different sources (e.g., the mobile operators 111 versus the mobile computing device 102).

In some embodiments, the mobile computing device 102 has at least one processor 110, a memory area 112, and at least one user interface (e.g., a touch screen or natural user interface). The processor 110 includes any quantity of processing units, and is programmed to execute computer-executable instructions for implementing aspects of the disclosure. The instructions may be performed by the processor 110 or by multiple processors executing within the mobile computing device 102, or performed by a processor external to the mobile computing device 102. In some embodiments, the processor 110 is programmed to execute instructions such as those illustrated in the figures.

In some embodiments, the processor 110 represents an implementation of analog techniques to perform the operations described herein. For example, the operations may be performed by an analog computing device and/or a digital computing device.

The mobile computing device 102 further has one or more computer readable media such as the memory area 112. The memory area 112 includes any quantity of media associated with or accessible by the mobile computing device 102. The memory area 112 may be internal to the mobile computing device 102 (as shown in FIG. 1), external to the mobile computing device 102 (not shown), or both (not shown). In some embodiments, the memory area 112 includes read-only memory and/or memory wired into an analog computing device.

The memory area 112 stores, among other data, one or more applications 114. The applications 114, when executed by the processor 110, operate to perform functionality on the mobile computing device 102. Exemplary applications 114 include mail application programs, web browsers, calendar application programs, address book application programs, messaging programs, media applications, location-based services, search programs, and the like. The applications 114 may communicate with counterpart applications or services such as the web services 108 accessible via the network 109. For example, the applications 114 may represent downloaded client-side applications that correspond to server-side services executing in a cloud.

The mobile computing device 102 further establishes and maintains one or more network connections 130 representing communication channels or other means for sending and/or receiving data over the network 109. Exemplary network connections 130 include, but are not limited to, Wi-Fi, cellular, tethered, BLUETOOTH brand communication, near-field communication (NFC), and more. The network connections 130 may also be categorized into voice, text, data, or other categories or types of network traffic.

The memory area 112 further stores data describing at least one data usage plan 116 associated with the user 104. In some embodiments, the memory area 112 stores a plurality of data usage plans 116. The data describing the data usage plans 116 may be received from the mobile operators 111 offering the data usage plans 116.

The data usage plan 116 may be represented by a schema (e.g., an extensible markup language schema) or other data structure. For example, the user 104 has contracted with the mobile operator 111 to receive network data transfer services from the mobile operator 111. The data usage plan 116 describes the services provided by the mobile operator 111, such as the amount of network data the user 104 can consume during a particular duration (e.g., a billing time period). For example, the data usage plan 116 describes threshold values 118 associated with the network connections 130 of one or more devices of the user 104. The threshold values 118 represent a maximum amount of network data consumption allotted under the data usage plan 116 for the network connections 130. For example, one threshold value 118 may indicate a maximum amount of network data consumption for a Wi-Fi connection, while another threshold value 118 indicates a maximum amount of network data consumption for a cellular data connection.

The schema or other data structure representing the data usage plan 116 may be defined by the web service 108, by the mobile operator 111, or by another entity. In some embodiments, each of the various data usage plans 116 subscribed to by the mobile computing device 102 and the other computing devices 106 use the same common schema. In general, the schema enables descriptions of the parts, components, services, features, or other aspects of the data usage plan 116 including, but not limited to, multi-rate data plans, peak times, roaming rates, allotted network data consumption per network connection 130, etc. In some embodiments, use of the schema allows the mobile operators 111 to send out updated portions of the schema corresponding to updated parts of a particular data usage plan 116.

Aspects of the disclosure are operable with any quantity of populated schemas. Each of the populated schemas is associated with a different one of the data usage plans 116. For example, the mobile computing device 102 may have more than one cellular connection, and each of the cellular connections work independently (e.g., multiple radios operating independently of each other). In such embodiments, there may be multiple data usage plans 116 active per cellular connection. Exemplary environments include dual subscriber identity module (SIM) dual active devices (both connections independently active) or dual SIM dual standby devices (one connection is in a standby mode). Additional examples include virtual SIMs, universal integrated circuit cards (UICCs), and other variants of user identity modules.

In some embodiments, the schema includes a plurality of fields. Each of the threshold values 118 may be associated with one or more of the fields. For example, the fields may correspond to one or more of the following: peak times, off-peak times, peak time network data consumption quota, off-peak time network data consumption quota, peak time network data consumption remaining, off-peak time network data consumption remaining, a roaming rate, rules, a mobile operator name, a billing cycle type, a network connection type, identification of free hosts available for connection, a list of mobile hotspots, and any other elements or information pertaining to the data usage plan 116. The list of free hosts represents zero-rated or reduced cost hosts (e.g., visiting particular web sites does not count against the data usage plan 116).

The schema may also include fields supporting different billing rates per host accessed, per weekend, per night, friends and family rates, peak and off-peak rates, and more. The schema also allows each mobile operator 111 the flexibility to define complex plans including broadly offered plans, and dynamic, short-term offers to specific users 104 likely to use a specific part or parts of the overall services. Other offers based on any combination of the metrics obtained are available to the mobile operator 111.

The schema stored by the mobile computing device 102 may also include fields corresponding to the data usage statistics 120 collected, generated, or received by the mobile computing device 102 and/or the mobile operators 111. For example, to facilitate sharing the data usage statistics 120 among the mobile operators 111, web service 108, and/or user computing devices, the mobile operators 111, web service 108, and the user computing devices may populate the schema with the data usage statistics 120.

While the schema may take any form or structure, the schema may be implemented as XML schema. Appendix A includes an exemplary XML schema for use in aspects of the disclosure.

The memory area 112 further stores the data usage statistics 120 relating to one or more of the data usage plans 116. The data usage statistics 120 may include a current, instant, or historical snapshot of the amount of data transmitted and/or received by the mobile computing device 102. For example, the mobile computing device 102 collects ongoing usage data relating to network data transfers, such as from device radios, drivers, and accelerometers of the mobile computing device 102. The data usage statistics 120 identify, to a granularity of time (e.g., per minute) or data (e.g., per kilobyte), how much data has been sent and/or received (e.g., consumed) by the mobile computing device 102, the time and date of usage, the location of usage, network interface used (e.g., over which network connections 130), the SIM card or other user identity module used for dual SIM scenarios, the international mobile station equipment identity (IMEI) or other device identifier for multi-device scenarios, the IP or other address of the access point used for Wi-Fi scenarios, the IP or other address of the target computer (e.g., for whitelist/blacklists in data usage), the application responsible for the data transfer, and the like. In a further example, information relating to text messages, data, voice calls, minutes used, voice over Internet Protocol (VoIP) usage, and any other element of usage consumed by, or that impacts, the mobile computing device 102 is collected to produce the data usage statistics 120. Other data usage statistics 120 are also contemplated.

In some embodiments, current data usage statistics 120 represent network data consumed during a portion of a pre-defined time interval. For example, the current data usage statistics 120 may represent the cumulative amount of network data transferred in the current billing cycle.

The data usage statistics 120 may be collected by the mobile computing device 102, the web service 108, and/or the mobile operators 111. For example, the data usage statistics 120 may be compiled directly (e.g., by monitoring network traffic) and/or by collecting the data usage statistics 120 from other devices that perform the collection.

Alternatively or in addition, the mobile computing device 102 receives updates of network data consumption by the other computing devices 106 sharing the same data usage plan 116. For example, the data usage statistics 120 may represent the network data collectively consumed by a mobile telephone, tablet, and laptop of the user 104.

In a further example, the mobile operator 111 collects data usage statistics 120 corresponding to a plurality of data usage plans 116. In such an example, there may be a plurality of sets of data usage statistics 120 (e.g., one set for each data usage plan 116 or user 104).

In some embodiments, the mobile operator 111 may have more current and/or more accurate data usage statistics 120 for one or more of the user computing devices than the user computing devices. For example, the mobile operator 111 may have more current and/or more accurate data usage statistics 120 for particular network connections 130 than the user computing devices. The mobile operator 111 may push, or transmit upon demand, such data usage statistics 120 to the web service 108 and/or to the mobile computing device 102. The web service 108 and/or the mobile computing device 102 integrates or otherwise reconciles the data from the mobile operator 111 and/or the user computing devices to produce the data usage statistics 120, which are then sent to the mobile computing device 102 for storage.

The memory area 112 further stores at least one of the data usage patterns 121, in some embodiments. The data usage pattern 121 represents the expected pattern of network data consumption over the time interval (e.g., billing cycle). The data usage pattern 121 may be generated or derived from historical data usage statistics 120 (e.g., combined over time). For example, the data usage pattern 121 may be produced as an average, mean, or other mathematical calculation involving the historical data usage statistics 120. The data usage pattern 121 may be updated at different times. For example, the data usage pattern 121 may be updated at the close of each time interval (e.g., billing cycle), and/or on demand by the user 104.

The memory area 112 further stores a plurality of data usage states 123. The data usage states 123 represent a progression, analysis, trending, or other statistical inference or calculation comparing the current data usage statistics 120 to the data usage pattern 121. Aspects of the disclosure are operable with any quantity or description of the data usage states 123. Exemplary data usage states 123 include, but are not limited to, On Track, Off Track, Over Limit, and Under Track.

The memory area 112 further stores exemplary computer-executable components such as a collection component 124, a user interface component 128, and a prediction component 126. Operation of the computer-executable components, when executed, is described below with reference to FIG. 3.

Figure 2:
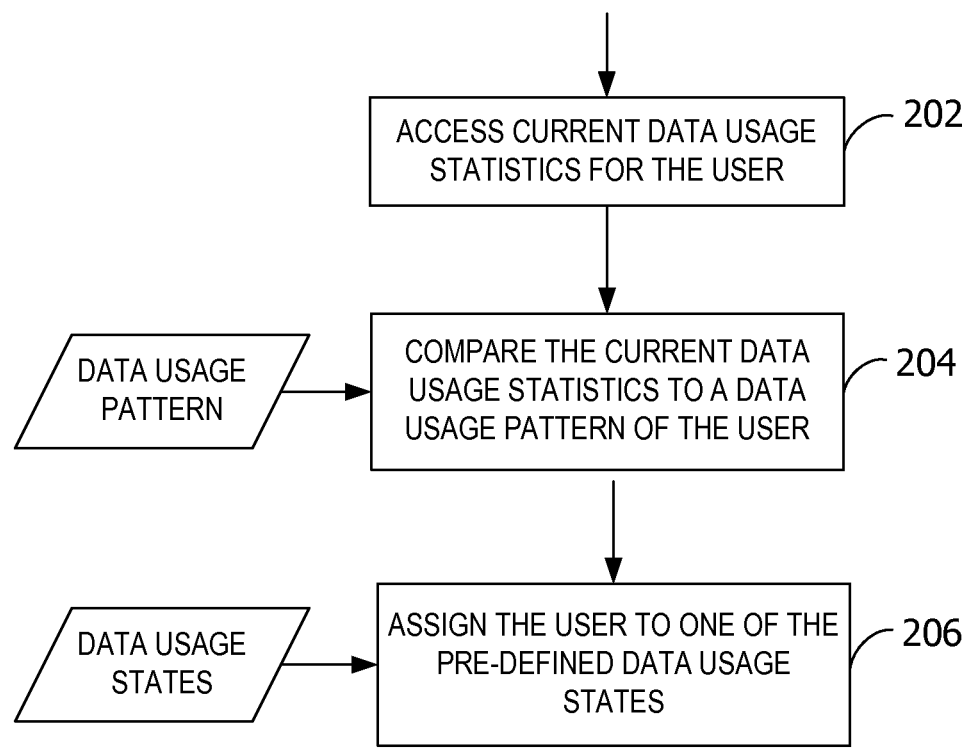
FIG. 2 is an exemplary flow chart illustrating operation of the computing device or web service to assign one of the data usage states to the user based on data usage statistics and a data usage pattern.

Referring next to FIG. 2, an exemplary flow chart illustrates operation of the computing device or web service 108 to assign one of the data usage states 123 to the user 104 based on data usage statistics 120 and the data usage pattern 121. While the operations illustrated in FIG. 2 may be performed by the mobile computing device 102 or the web service 108 in some embodiments, one or more of the operations may be performed by other devices, including any computing device local to, or remote from, the user 104. For example, the operations may be performed by a proxy device in communication with the mobile computing device 102. Further, in some embodiments, the operations illustrated in FIG. 2 are performed by an operating system executing on the mobile computing device 102.

At 202, a computing device accesses current data usage statistics 120 for the user 104. The current data usage statistics 120 represent network data consumed during at least a portion of a pre-defined time interval (e.g., a billing cycle) by at least one computing device of the user 104. For example, the current data usage statistics 120 represent network data consumed collectively and cumulatively by a tablet and a mobile telephone of the user 104 since the beginning of the last billing cycle. Accessing the current data usage statistics 120 includes, for example, receiving and/or generating data corresponding to at least a portion of the current data usage statistics 120 from the mobile operator 111 and/or one or more of the plurality of computing devices of the user 104.

Figure 4:
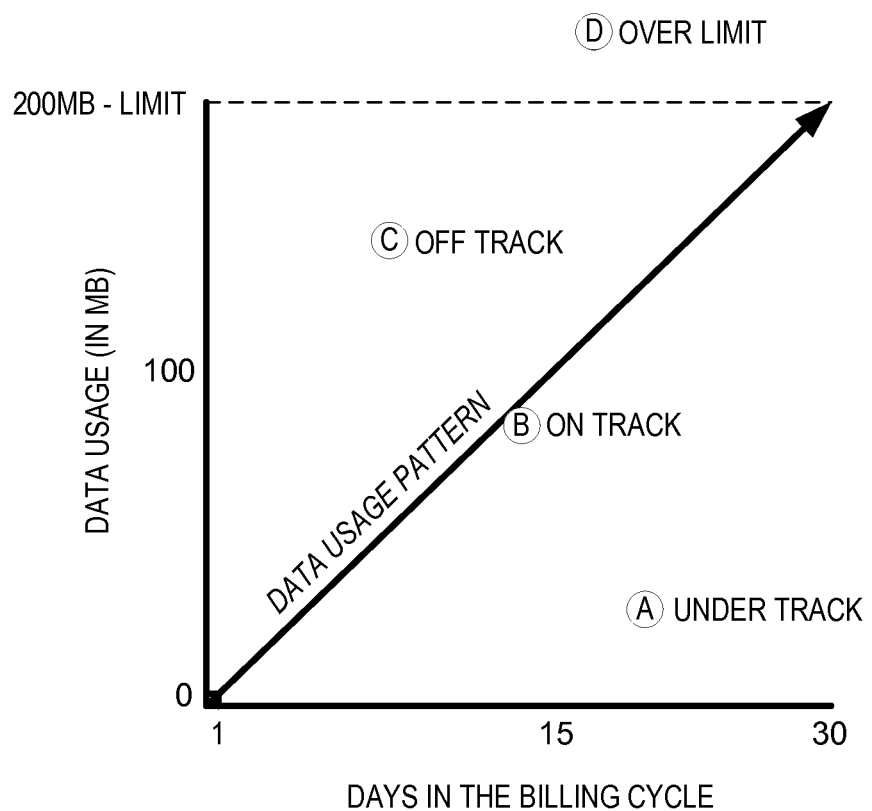
FIG. 4 is an exemplary graph illustrating data usage statistics relative to a linear data usage pattern over a monthly billing cycle.
Figure 5:
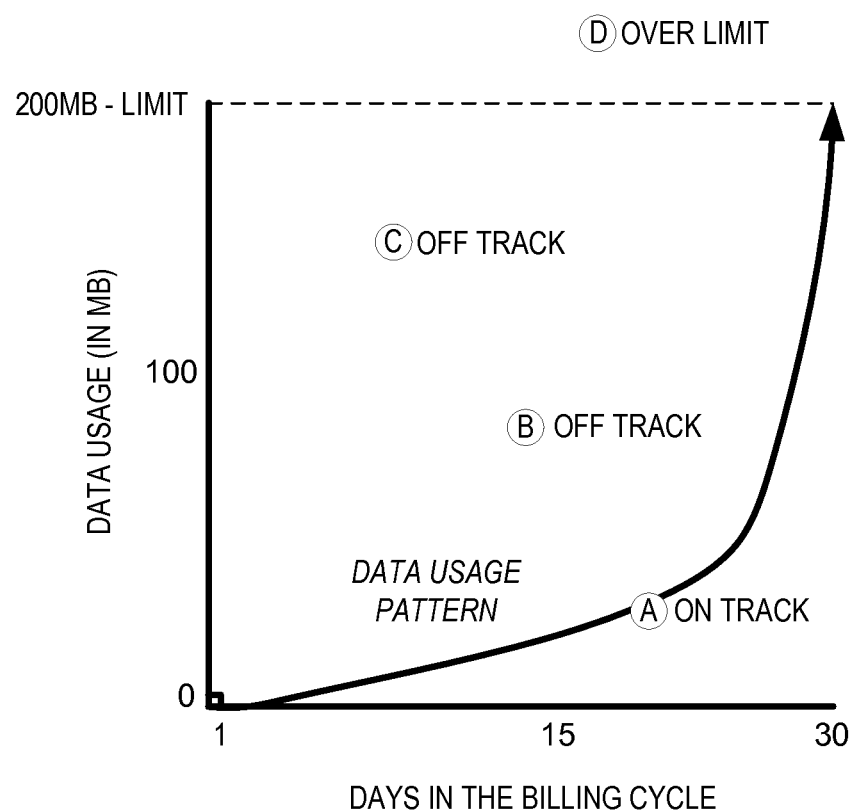
FIG. 5 is an exemplary graph illustrating data usage statistics relative to a non-linear data usage pattern over a monthly billing cycle.
Figure 6:
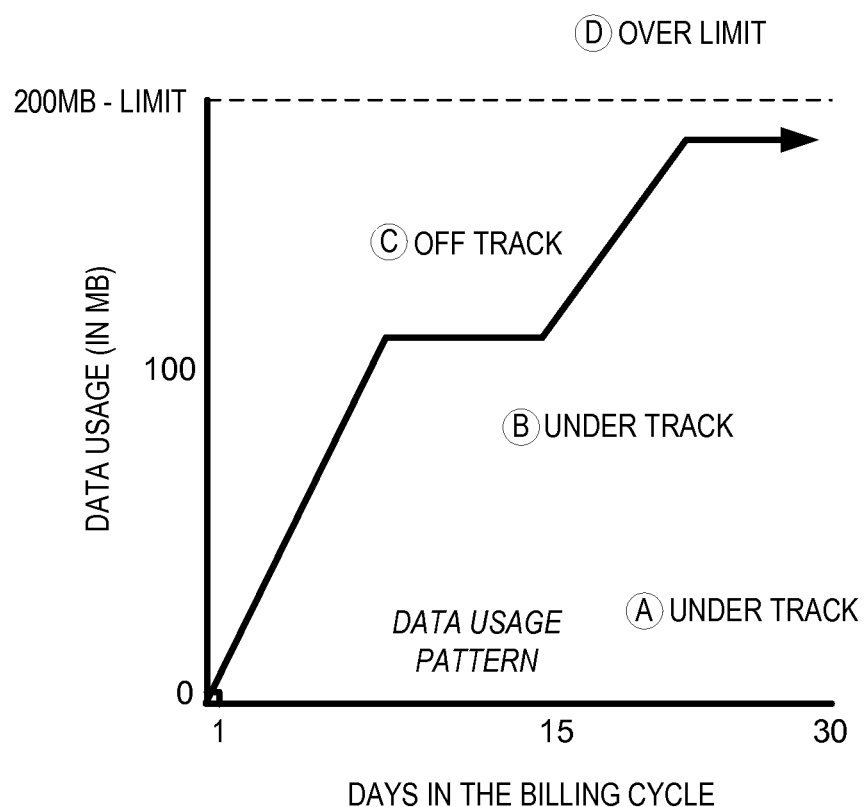
FIG. 6 is an exemplary graph illustrating data usage statistics relative to another non-linear data usage pattern over a monthly billing cycle.

At 204, the computing device compares the accessed current data usage statistics 120 to the data usage pattern 121 associated with the user 104. The data usage pattern 121 is a function of historical data usage statistics 120 for the user 104 (e.g., over the past year or half-year, since the start date of the data usage plan 116, etc.). The data usage pattern 121 reflects the trending (e.g., past and/or predicted) of the network data consumption over the course of the pre-defined time interval (e.g., the billing cycle). Exemplary data usage patterns 121 are shown in FIG. 4, FIG. 5, and FIG. 6.

At 206, the computing device assigns the user 104 to one of a plurality of pre-defined data usage states 123. The pre-defined data usage states 123 represent a description of the current data usage statistics 120 relative to the data usage pattern 121. For example, the data usage states 123 indicate or predict whether the user 104 is likely to use most or all of the network data allotted under the data usage plan 116, use less than the allotted network data, or use more than the allotted network data, in some embodiments. Comparing the current data statistics with the data usage pattern 121 enables the computing device to predict future network data consumption by the user 104.

In some embodiments, the computing device performs the operations illustrated in FIG. 2 each day of the billing cycle or at other times, such as every week or every few days. In general, the computing device performs the operations for each of a plurality of portions of the pre-defined time interval. In this manner, the computing device is able to track the assigned data usage states 123 and perform an analysis on the tracked data usage states 123. For example, the computing device calculates the amount of time spent by the user 104 in each of the assigned data usage states 123. The calculated time spent for each of the data usage states 123 represents a cumulative duration spent by the user 104 in each of the assigned data usage states 123.

The computing device may further compare the accessed current data usage statistics 120 to the threshold values 118 available from the data usage plan 116. The threshold values 118 represent an allocation of network data consumption for each of the network connections 130. For example, the computing device 102 may track a cumulative amount of data transfers occurring over each of the network connections 130. The computing device 102 compares the tracked, cumulative amounts (representing the current data usage statistics 120) to the corresponding threshold values 118 associated with each of the network connections 130. By comparing the current data usage statistics 120 to the threshold values 118, the computing device determines how much network data consumption remains available for each of the network connections 130. The remaining amount of network data consumption may be presented or displayed to the user 104, such as in the user interface.

The computing device may also compare the accessed data usage statistics 120 of the user 104 to data usage statistics 120 of other users 104. In this manner, the computing device identifies similarities and differences in network data consumption among the users 104, such as for business intelligence purposes (e.g., targeting particular users 104 with products and/or services, sharing recommendations for reducing network data consumption, etc.).

Figure 3:
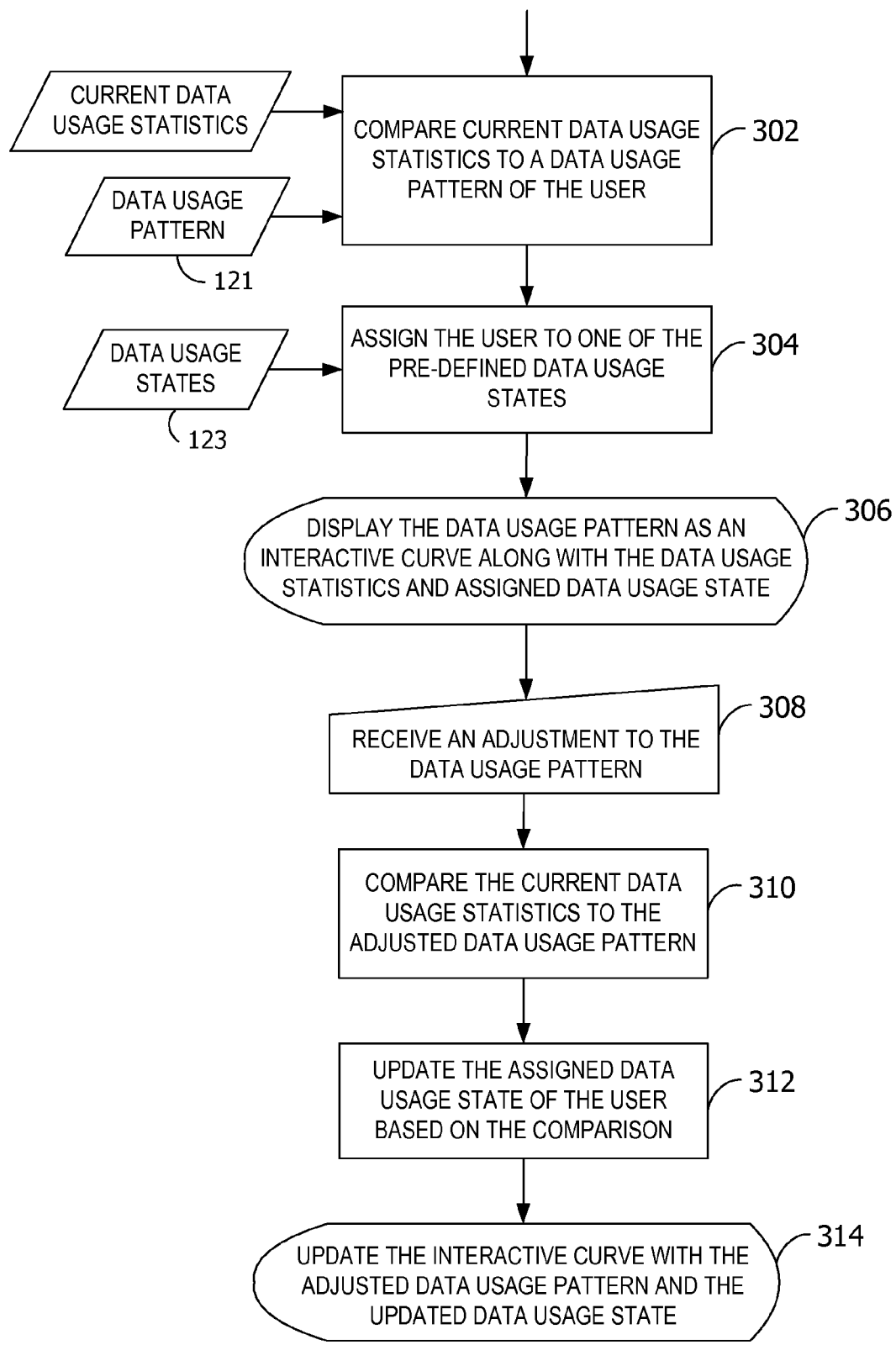
FIG. 3 is an exemplary flow chart illustrating operation of the computing device to assign one of the data usage states to the user based on data usage statistics and a displayed, interactive data usage pattern.

Referring next to FIG. 3, an exemplary flow chart illustrates operation of the computing device to assign one of the data usage states 123 to the user 104 based on data usage statistics 120 and a displayed, interactive data usage pattern 121. While the operations illustrated in FIG. 2 may be performed by the mobile computing device 102 in some embodiments, one or more of the operations may be performed by other devices, including any computing device local to, or remote from, the user 104.

At 302, the computing device compares the current data usage statistics 120 to the data usage pattern 121 of the user 104. As described above, the data usage pattern 121 corresponds to previous data usage statistics 120 of the user 104 (e.g., cumulative over several billing cycles). At 304, the computing device assigns the user 104 to one of the pre-defined data usage states 123 based on a comparison between the current data usage statistics 120 and the data usage pattern 121.

At 306, the computing device displays the data usage pattern 121 to the user 104. For example, the computing device may display the data usage pattern 121 as a curve in a graph in the user interface (e.g., see FIG. 4, FIG. 5, and FIG. 6). The computing device may also plot the current data usage statistics 120 in the same graph, and relative to the displayed data usage pattern 121. Text identifying the data usage state 123 may also be displayed in the graph in some embodiments, although other embodiments contemplate conveying the assigned data usage state 123 to the user 104 in other ways. For example, the computing device may identify the assigned data usage state 123 separate from the data usage pattern 121 and the data usage statistics 120.

At 308, the computing device receives an adjustment to the data usage pattern 121 from the user 104. For example, the user 104 may identify another data usage pattern 121, adjust the currently displayed data usage pattern 121, and/or otherwise make changes to the data usage pattern 121. As an example scenario, the user 104 adjusts the data usage pattern 121 for the remaining days of the billing cycle to indicate that the user 104 will be on vacation and using a particular one of the network connections 130 (e.g., cellular) less than usual. As another example scenario, the user 104 adjusts the data usage pattern 121 to indicate that the user 104 expects to consume more network data than usual during the remaining days of the billing cycle.

In some embodiments, the user 104 adjusts the displayed data usage pattern 121 by interacting with the curve in the user interface. In such embodiments, the data usage pattern 121 is displayed as an interactive curve having a plurality of segments capable of being adjusted. For example, the user 104 is able to drag one or more segments or portions up and down (e.g., increase and decrease the expected network data consumption) for the remaining portion of the billing cycle.

In response to the adjustments to the data usage pattern 121, the computing device compares the current data usage statistics 120 to the adjusted data usage pattern 121 at 310 and updates the assigned data usage state 123 at 312. For example, the computing device assigns, or re-assigns, the user 104 to one of the pre-defined data usage states 123 based on the comparison between the current data usage statistics 120 and the adjusted data usage pattern 121.

The computing device updates the interactive curve displayed in the user interface at 314 with the adjusted data usage pattern 121. The updated data usage state 123 may also be displayed in the user interface, or conveyed otherwise to the user 104.

In some embodiments, one or more of the operations illustrated in FIG. 3 are performed by the computer-executable components illustrated in FIG. 1. For example, the collection component 124, when executed by the processor 110 of the mobile computing device 102, causes the processor 110 to access the current data usage statistics 120 for the user 104 and the data usage pattern 121 associated with the user 104. The user interface component 128, when executed by the processor 110 of the mobile computing device 102, causes the processor to display the data usage pattern 121 as an interactive curve with the data usage statistics 120 displayed relative thereto. The user interface component 128 further receives from the user 104 an adjustment to the data usage pattern 121.

The prediction component 126, when executed by the process of the mobile computing device 102, causes the processor 110 to assign the user 104 to one of the pre-defined data usage states 123 based on a comparison between the current data usage statistics 120 and the adjusted data usage pattern 121. The user interface component 128 further displays to the user 104 the assigned data usage state 123.

Referring next to FIG. 4, an exemplary graph illustrates data usage statistics 120 relative to a linear data usage pattern 121 over a monthly billing cycle. In the example of FIG. 4, the exemplary data usage plan 116 indicates that 200 megabytes (MB) is the threshold values 118 for a particular network connection 130 type (e.g., cellular) each month. Other threshold values 118 (e.g., other than 200 MB) and other billing periods (e.g., other than one month), however, are contemplated. The line in the graph in FIG. 4 reflects the expected linear usage of the 200 MB over the course of the month. However, non-linear usage is also contemplated, as shown in FIG. 5 and FIG. 6. In general, the shape of the curve is fit to, or otherwise dependent on, the pattern of the usage (e.g., the data usage pattern 121).

The computing device 102 (and/or the mobile operator 111) tracks the data consumption by the user 104 and/or computing device 102 to generate the data usage statistics 120. In other embodiments, the data usage statistics 120 are received from another entity performing the tracking. The circles A, B, C, and D in the graph represent plotted examples of different network data consumption values from the data usage statistics 120 at particular days in the month. For ease of comparison, the four exemplary values are plotted in the same graph. The location of the circles relative to the curve representing the data usage pattern 121 indicates whether the computing device determines that the network data consumption of the user 104 and/or computing device 102 is Off Track (e.g., Circle C—above the linear usage line, the user 104 is on track to exceed 200 MB of data consumption before the end of the month), On Track (e.g., Circle B—approximately matching the linear usage line, the user 104 is on track to consume 200 MB around the end of the month), or Under Track (e.g., Circle A—below the linear usage line, the user 104 is not on track to consume the full 200 MB before the end of the month).

Given the day of the billing cycle and the current or up-to-date data consumption for the billing period, an extrapolation or projection is performed to predict the consumption associated with the end of the billing cycle. In some embodiments, Off Track may be defined as the user 104 being on or above the projected limit (e.g., the value of the curve) given the day within the billing cycle and the current or up-to-date data consumption for the billing period. Similarly, On Track may be defined as the user 104 being at least 5% below the projected limit given the day of the billing cycle and the current or up-to-date data consumption for the billing period. Under Track may be defined as the user 104 being at least 20% below the projected limit given the day of the billing cycle and the current or up-to-date data consumption for the billing period. In some further embodiments, a notification is sent to the user 104 and/or applications 114 if the data usage is within 10% of the limit for a particular network connection 130 at any point during the billing period. The computing device 102 may then halt data transfer requests using that network connection 130.

Some embodiments contemplate an "Over Limit" category that allows users 104 to opt out of data consumption by background transfers unless the background transfers are user-initiated or deemed critical. In the example of FIG. 4, Circle D corresponds to an exemplary network data consumption value that prompts the computing device to conclude that the user 104 is in the Over Limit data usage state 123.

Rather than display the text of the assigned data usage state 123, the assigned data usage state 123 may be conveyed to the user 104 via other means. For example, the data usage statistics 120 may be plotted or graphed with a particular symbol, color-coded, or otherwise visually indicated to the user 104 based on the assigned data usage state 123. In some embodiments, for example, data usage statistics 120 plotted with a red circle indicates the Off Track data usage state 123, a yellow circle indicates the Under Track data usage state 123, and a green circle indicates the On Track data usage state 123.

The same four exemplary network data consumption values plotted in FIG. 4 are also plotted in FIG. 5 and FIG. 6, but FIG. 5 and FIG. 6 show different data usage patterns 121. As described below, the assigned data usage state 123 changes based on the position of each exemplary network data consumption value relative to the data usage pattern 121.

Referring next to FIG. 5, an exemplary graph illustrates data usage statistics 120 relative to a non-linear data usage pattern 121 over a monthly billing cycle. In this example, the data usage pattern 121 is approximately, substantially, or somewhat exponential, with increasing amounts of network data consumption as the month progresses.

Given the differing data usage patterns 121 between FIG. 4 and FIG. 5, the computing device may assign different data usage states 123 to the same exemplary network data consumption values shown in FIG. 4. For example, while Circle C still corresponds to the Off Track data usage state 123 and Circle D still corresponds to the Over Limit data usage state 123, Circle B in FIG. 5 now corresponds to the Off Track data usage state 123 and Circle A in FIG. 5 now corresponds to the On Track data usage state 123.

Referring next to FIG. 6, an exemplary graph illustrates data usage statistics 120 relative to another non-linear data usage pattern 121 over a monthly billing cycle. In this example, the data usage pattern 121 is approximately, substantially, or somewhat step-wise, with step increases in network data consumption occurring at particular times within the month.

Given the differing data usage patterns 121 between FIG. 4 and FIG. 6, the computing device may assign different data usage states 123 to the same exemplary network data consumption values shown in FIG. 4. For example, Circle C still corresponds to the Off Track data usage state 123, Circle D still corresponds to the Over Limit data usage state 123, and Circle A still corresponds to the Under Limit data usage state 123. However, Circle B in FIG. 6 now corresponds to the Under Track data usage state 123.

The data usage patterns 121 illustrated in FIG. 4, FIG. 5, and FIG. 6 are merely exemplary. The data usage patterns 121 may take the form of any curve. Further, any of the information displaying in FIG. 4, FIG. 5, and FIG. 6 may be conveyed to the user 104 via a tile in the user interface. In some embodiments, tiles represent tile user interface elements. Additionally, the tiles may be pinned to a home screen of the mobile telephone to enable the user 104 to instantly view the current data usage statistics 120 (e.g., whether data is currently being consumed, how much data has been consumed, how much data is being consumed, etc.), the data usage pattern 121, the assigned data usage state 123, how much data remains available under the data usage plan 116 (e.g., for each of the network connections 130), and other information relating to network data consumption by the user 104. In an example involving a family or shared data plan, the statistics for each plan member may be shown in separate tiles.

Additional Examples

While described with reference to one data usage pattern in some embodiments, aspects of the disclosure may be operable with a plurality of data usage patterns or models based on bearer transport. That is, the operations described herein may be applied concurrently to more than one network. As an example, network data may be segregated for routing by bearer transport, such as cellular, wireless local area network (WLAN), etc. The operations illustrated in FIG. 2 and/or FIG. 3 may be applied to the data usage statistics 120 relating to each of the different transport types, resulting in the assignment of one of the data usage states for each of the different transport types. For example, the user may be Off Track for data usage over a cellular network connection, but On Track for data usage over a costed WLAN connection.

In an example having dual SIMs, each of the dual SIMs may have one data usage plan associated therewith. Each data usage plan may then have one data usage pattern and, after execution of the operations illustrated and described with reference to FIG. 2 and/or FIG. 3, one data usage state assigned thereto.

At least a portion of the functionality of the various elements in FIG. 1 may be performed by other elements in FIG. 1, or an entity (e.g., processor, web service, server, application program, computing device, etc.) not shown in FIG. 1.

In some embodiments, the operations illustrated in FIG. 2 and FIG. 3 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The term "roaming" as used herein refers, in some embodiments, to connectivity provided outside a subscriber's home zone that may be subject to additional tariffs, fees, or constraints. Roaming service may or may not be provided by the same mobile operator 111. The term "tethered" as used herein refers, in some embodiments, to situations where one device acts as an access point for another device for network access. A tethered connection may occur over a wired connection or a wireless connection. The term "Wi-Fi" as used herein refers, in some embodiments, to a wireless local area network using high frequency radio signals for the transmission of data. The term "BLUETOOTH" as used herein refers, in some embodiments, to a wireless technology standard for exchanging data over short distances using short wavelength radio transmission. The term "cellular" as used herein refers, in some embodiments, to a wireless communication system using short-range radio stations that, when joined together, enable the transmission of data over a wide geographic area. The term "NFC" as used herein refers, in some embodiments, to a short-range high frequency wireless communication technology for the exchange of data over short distances.

Embodiments have been described with reference to data monitored and/or collected from users 104. In some embodiments, notice may be provided to the users 104 of the collection of the data (e.g., via a dialog box or preference setting) and users 104 are given the opportunity to give or deny consent for the monitoring and/or collection. The consent may take the form of opt-in consent or opt-out consent.

Exemplary Operating Environment

Aspects of the disclosure are capable of operation and/or display on any computing device or screen. For example, the user 104 may move between a mobile device, a gaming console, an in-vehicle computing system (e.g., entertainment and/or navigation), a portable media player, and a laptop.

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Such systems or devices may accept input from the user 104 in any way, including from input devices such as a keyboard or pointing device, via gesture input, and/or via voice input.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for predicting network data consumption under the data usage plan 116 relative to the data usage pattern 121.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Listed below are exemplary schema portions that are operable in aspects of the disclosure to represent the data usage plan. While written in extensible markup language (XML) format, the schema may be implemented in other formats.

```
<?xml version="1.0" encoding="UTF-8"?>
<xs:schema xmlns:xs="Base/v1"
elementFormDefault="qualified"
targetNamespace="CarrierControl/Base/v1">
```

```
    <!-- Basic types -->
<xs:simpleType name="NameType">
    <xs:restriction base="xs:normalizedString">
        <xs:minLength value="1"/>
        <xs:maxLength value="255"/>
        <xs:whiteSpace value="collapse"/>
    </xs:restriction> </xs:simpleType>
<xs:simpleType name="Priority">
    <xs:restriction base="xs:nonNegativeInteger">
        <xs:maxExclusive value="10"/>
    </xs:restriction>
</xs:simpleType>
<xs:simpleType name="GUID">
    <xs:annotation>
        <xs:documentation xml:lang="en"> The representation of a GUID,
generally the id of an element. </xs:documentation>
    </xs:annotation>
    <xs:restriction base="xs:token">
        <xs:pattern value="\{[a-fA-F0-9]{8}-[a-fA-F0-9]{4}-[a-fA-F0-9]{4}-[a-fA-F0-9]{4}-[a-fA-F0-9]{12}\}"/>
    </xs:restriction>
</xs:simpleType>
<xs:simpleType name="SubscriberType">
    <xs:restriction base="xs:token">
        <xs:maxLength value="20"/>
        <xs:pattern value="\w+"/>
    </xs:restriction>
</xs:simpleType>
<xs:complexType name="CertificateDetails">
    <xs:annotation>
        <xs:documentation> Used to identify a certificate or set of certificates.
SubjectName is compared against the DN provided as the certificate's Subject field, or
against any Name provided in the SubjectAlternativeName extentions of type
DirectoryName. IssuerName is compared against the DN provided as the certificate's
Issuer field, or against any Name provided in the IssuerAlternativeName extentions of
type DirectoryName. </xs:documentation>
    </xs:annotation>
    <xs:sequence>
        <xs:element name="SubjectName" type="xs:string"/>
        <xs:element name="IssuerName" type="xs:string"/>
    </xs:sequence>
</xs:complexType>
<!-- Alias definitions -->
<xs:element name="AliasList">
    <xs:complexType>
        <xs:sequence>
            <xs:element maxOccurs="unbounded" ref="AliasDefinition"/>
        </xs:sequence>
    </xs:complexType>
</xs:element>
<xs:complexType name="AliasDefinitionBaseType">
    <xs:attribute name="Name" type="xs:string"/>
</xs:complexType>
<xs:element name="AliasDefinition" type="AliasDefinitionBaseType" abstract="true"/>
<!-- Locations -->
<xs:simpleType name="ProviderNameType">
    <xs:restriction base="xs:normalizedString">
        <xs:minLength value="1"/>
        <xs:maxLength value="20"/>
        <xs:whiteSpace value="collapse"/>
    </xs:restriction>
</xs:simpleType>
<xs:simpleType name="ProviderIdType">
    <xs:restriction base="xs:token">
        <xs:pattern value="\d{1,6}"/>
    </xs:restriction>
</xs:simpleType>
<xs:complexType name="ProviderType">
    <xs:sequence>
        <xs:element name="ProviderID" type="ProviderIdType"/>
        <xs:element name="ProviderName" type="ProviderNameType"/>
    </xs:sequence>
</xs:complexType>
<xs:complexType name="LocationType">
    <xs:choice maxOccurs="unbounded">
        <xs:element name="Provider" type="ProviderType"/>
        <xs:element name="LocationAlias" type="xs:string"/>
    </xs:choice>
```

```xml
            <xs:attribute name="negate" type="xs:boolean" default="false"/>
        </xs:complexType>
        <xs:element name="LocationAliasDefinition"
type="LocationAliasDefinitionType" substitutionGroup="AliasDefinition"/>
        <xs:complexType name="LocationAliasDefinitionType">
            <xs:complexContent>
                <xs:extension base="AliasDefinitionBaseType">
                    <xs:sequence>
                        <xs:element name="Location" type="LocationType"/>
                    </xs:sequence>
                </xs:extension>
            </xs:complexContent>
        </xs:complexType>
        <!-- Times -->
        <xs:complexType name="TimeType">
            <xs:choice maxOccurs="unbounded">
                <xs:element name="TimePeriod" type="TimePeriod"/>
                <xs:element name="RecurringTimePeriod"
type="RecurringTimePeriod"/>
                <xs:element name="TimeAlias" type="xs:string"/>
            </xs:choice>
            <xs:attribute name="negate" type="xs:boolean" default="false"/>
        </xs:complexType>
        <xs:element name="TimeAliasDefinition" type="TimeAliasDefinitionType"
substitutionGroup="AliasDefinition"/>
        <xs:complexType name="TimeAliasDefinitionType">
            <xs:complexContent>
                <xs:extension base="AliasDefinitionBaseType">
                    <xs:sequence>
                        <xs:element name="Time" type="TimeType"
maxOccurs="unbounded"/>
                    </xs:sequence>
                </xs:extension>
            </xs:complexContent>
        </xs:complexType>
        <xs:simpleType name="TimeOfWeek">
            <xs:annotation>
                <xs:documentation> Defines a time as an offset from the midnight
preceding 12:00:01 AM Sunday (P0D) to the midnight following 11:59:59 PM
Saturday (P7D). </xs:documentation>
            </xs:annotation>
            <xs:restriction base="xs:duration">
                <xs:minInclusive value="P0D"/>
                <xs:maxInclusive value="P7D"/>
            </xs:restriction>
        </xs:simpleType>
        <xs:complexType name="RecurringTimePeriod">
            <xs:annotation>
                <xs:documentation> Defines a period of time within the week as a
start/end TimeOfWeek. If EndTime is less than StartTime, the period is interpreted as
crossing Saturday night. </xs:documentation>
            </xs:annotation>
            <xs:attribute name="StartTime" type="TimeOfWeek" use="required"/>
            <xs:attribute name="EndTime" type="TimeOfWeek" use="required"/>
        </xs:complexType>
        <xs:complexType name="TimePeriod">
            <xs:annotation>
                <xs:documentation> Defines a period of time as a start/end date and time.
</xs:documentation>
            </xs:annotation>
            <xs:attribute name="StartTime" type="xs:dateTime" use="required"/>
            <xs:attribute name="EndTime" type="xs:dateTime" use="required"/>
        </xs:complexType>
</xs:schema>
<?xml version="1.0" encoding="UTF-8"?>
<xs:schema xmlns:base="Base/v1"
elementFormDefault="qualified"
targetNamespace=" CarrierControl/Plans/v1">
    <xs:import schemaLocation="Alias.xsd"
        namespace="CarrierControl/Base/v1"/>
        <!-- Plan Definition -->
    <xs:complexType name="BillingCycleType">
        <xs:attribute name="StartDate" use="required" type="xs:dateTime"/>
        <xs:attribute name="Duration" use="required">
            <xs:simpleType>
                <xs:restriction base="xs:duration">
                    <xs:minExclusive value="PT0S"/>
                </xs:restriction>
            </xs:simpleType>
```

```
        </xs:attribute>
        <xs:attribute name="Resets" type="xs:boolean" default="true"/>
    </xs:complexType>
    <xs:simpleType name="CostStyleType">
        <xs:annotation>
            <xs:documentation> CostType expresses the incremental cost of a plan: -
Unrestricted: There is no incremental cost for consumption on this plan - Fixed:
Consumption goes against a quota which the user has purchased / agreed to purchase -
Variable: The user will be billed for incremental usage on this plan
</xs:documentation>
        </xs:annotation>
        <xs:restriction base="xs:string">
            <xs:enumeration value="Unrestricted"/>
            <xs:enumeration value="Fixed"/>
            <xs:enumeration value="Variable"/>
        </xs:restriction>
    </xs:simpleType>
    <xs:element name="Plan">
        <xs:complexType>
            <xs:sequence>
                <xs:element minOccurs="0" ref="Description"/>
                <xs:element minOccurs="0" ref="Usage"/>
            </xs:sequence>
            <xs:attribute name="Name" use="required" type="xs:string"/>
        </xs:complexType>
    </xs:element>
    <xs:element name="Description" type="DescriptionBaseType" abstract="true"/>
    <xs:complexType name="DescriptionBaseType">
        <xs:sequence>
            <xs:element name="BillingCycle" type="BillingCycleType"
minOccurs="0"/>
            <xs:element name="Conditions" minOccurs="0">
                <xs:complexType>
                    <xs:all>
                        <xs:element name="Location" type="base:LocationType"
minOccurs="0"/>
                        <xs:element name="Time" type="base:TimeType"
minOccurs="0"/>
                        <xs:element name="Direction" default="inout"
minOccurs="0">
                            <xs:simpleType>
                                <xs:restriction base="xs:token">
                                    <xs:enumeration value="in"/>
                                    <xs:enumeration value="out"/>
                                    <xs:enumeration value="inout"/>
                                </xs:restriction>
                            </xs:simpleType>
                        </xs:element>
                        <xs:element name="Destination" minOccurs="0">
                            <xs:complexType>
                                <xs:annotation>
                                    <xs:documentation> PhoneNumber only applies to
SMS/Voice plans; HostName only applies to data plans </xs:documentation>
                                </xs:annotation>
                                <xs:sequence>
                                    <xs:element name="PhoneNumber"
minOccurs="0">
                                        <xs:simpleType>
                                            <xs:restriction base="xs:string">
                                                <xs:pattern value="(\+)?\d+"/>
                                            </xs:restriction>
                                        </xs:simpleType>
                                    </xs:element>
                                    <xs:element name="HostName" minOccurs="0">
                                        <xs:simpleType>
                                            <xs:restriction base="xs:anyURI"/>
                                        </xs:simpleType>
                                    </xs:element>
                                </xs:sequence>
                            </xs:complexType>
                        </xs:element>
                        <xs:element name="LimitedUsage" minOccurs="0">
                            <xs:annotation>
                                <xs:documentation> For Fixed plans, provides details
on the user's quota: - Limit: The amount of the quota (in minutes for Voice plans,
megabytes for Data plans, and messages for SMS plans) - SharedPlan: Another plan
name whose quota is also consumed by usage on this plan - FallbackPlan: Another
plan name whose consumption begins when this quota is exhausted. If a Fallback Plan
is not provided, the current plan goes into an Overage state. </xs:documentation>
```

-continued

```
            </xs:annotation>
            <xs:complexType>
                <xs:attribute name="Limit" use="required" type="xs:nonNegativeInteger"/>
                <xs:attribute name="SharedPlan" type="xs:string"/>
                <xs:attribute name="FallbackPlan" type="xs:string"/>
            </xs:complexType>
        </xs:element>
    </xs:all>
</xs:complexType>
</xs:sequence>
<xs:attribute name="CostStyle" use="required" type="CostStyleType"/>
</xs:complexType>
<xs:complexType name="DataPlanDescriptionType">
    <xs:complexContent>
        <xs:extension base="DescriptionBaseType">
            <xs:sequence>
                <xs:element name="BandwidthInKbps" type="xs:nonNegativeInteger" minOccurs="0"/>
                <xs:element name="MaxDownloadFileSizeInMegabytes" type="xs:positiveInteger" default="25" minOccurs="0"/>
                <xs:element name="SecurityUpdatesExempt" type="xs:boolean" default="false" minOccurs="0"/>
            </xs:sequence>
        </xs:extension>
    </xs:complexContent>
</xs:complexType>
<xs:element name="DataPlanDescription" type="DataPlanDescriptionType" substitutionGroup="Description"/>
<xs:complexType name="SmsPlanDescriptionType">
    <xs:complexContent>
        <xs:extension base="DescriptionBaseType"/>
    </xs:complexContent>
</xs:complexType>
<xs:element name="SmsPlanDescription" type="SmsPlanDescriptionType" substitutionGroup="Description"/>
<xs:complexType name="VoicePlanDescriptionType">
    <xs:complexContent>
        <xs:extension base="DescriptionBaseType"/>
    </xs:complexContent>
</xs:complexType>
<xs:element name="VoicePlanDescription" type="VoicePlanDescriptionType" substitutionGroup="Description"/>
<xs:element name="Usage" type="PlanUsageType"/>
<xs:complexType name="PlanUsageType">
    <xs:attribute name="PlanName" use="required" type="xs:string"/>
    <xs:attribute name="OverLimit" type="xs:boolean"/>
    <xs:attribute name="Congested" type="xs:boolean"/>
    <xs:attribute name="CurrentUsage" use="required" type="xs:nonNegativeInteger"/>
    <xs:attribute name="UsageTimestamp" use="required" type="xs:dateTime"/>
</xs:complexType>
</xs:schema>
```

What is claimed is:

1. A system for interactive prediction of network data consumption, said system comprising:
a memory area associated with a mobile computing device of a user, said memory area storing current data usage statistics representing network data consumed during a portion of a current billing cycle by the mobile computing device, the memory area further storing a data usage pattern for the user; and
a processor programmed to:
assign the user to one of a plurality of pre-defined data usage states based on a comparison between the current data usage statistics stored in the memory area to the data usage pattern stored in the memory area, the data usage pattern representing historical network data consumption over the current billing cycle by the mobile computing device;
present the data usage pattern to the user;
receive, from the user associated with the data usage pattern, a request to adjust the displayed data usage pattern for a remaining portion of the same current billing cycle, the adjustment enabling the user to interactively modify the displayed data usage pattern;
compare the current data usage statistics to the adjusted data usage pattern;
re-assign the user to one of the plurality of pre-defined data usage states based on the comparison of the current data usage statistics to the adjusted data usage pattern; and
update the data usage pattern presented to the user with the adjusted data usage pattern.

2. The system of claim 1, further comprising a user interface, and wherein the processor is further programmed to display to the user the data usage pattern as an interactive curve in the user interface, the interactive curve having a plurality of segments capable of being modified by the user associated with the data usage pattern for the remaining portion of the same current billing cycle.

3. The system of claim 1, wherein the processor is further programmed to generate the current data usage statistics, the current data usage statistics representing network data consumed under a data usage plan.

4. The system of claim 1, wherein the processor is further programmed to generate the data usage pattern based on historical data usage statistics.

5. The system of claim 1, wherein the plurality of pre-defined data usage states comprises one or more of the following: on track, off track, over limit, and under track.

6. The system of claim 1, wherein the current data usage statistics include network data collectively consumed by a plurality of computing devices associated with the user.

7. A method, performed at least in part by a processor, the method comprising:
   accessing current data usage statistics for a plurality of transport types associated with a computing device, the current data usage statistics representing network data consumed during at least a portion of a current billing cycle by each of the plurality of transport types under a data usage plan;
   comparing, by a computing device, the accessed current data usage statistics to interactive data usage patterns associated with each of the plurality of transport types;
   assigning, by the computing device, one of a plurality of pre-defined data usage states to each of the plurality of transport types based on the comparison;
   presenting the interactive data usage patterns to the user associated with the interactive data usage patterns;
   receiving, from the user, a request to adjust one or more of the displayed interactive data usage patterns associated with each of the plurality of transport types for a remaining portion of the same current billing cycle, the adjustment enabling the user to modify the displayed interactive data usage patterns;
   comparing the current data usage statistics to the adjusted interactive data usage patterns;
   re-assigning the user to another of the plurality of pre-defined data usage states based on the comparison of the current data usage statistics to the adjusted interactive data usage pattern; and
   updating the displayed interactive data usage patterns with the adjusted interactive data usage pattern.

8. The method of claim 7, wherein assigning the plurality of pre-defined data usage states to each of the plurality of transport types comprises assigning the one of the plurality of pre-defined data usage states to each of the plurality of transport types for each of a plurality of portions of the current billing cycle.

9. The method of claim 8, further comprising calculating a cumulative time duration spent by a user of the computing device in each of the assigned pre-defined data usage states.

10. The method of claim 9, further comprising comparing the current data usage statistics to data usage statistics aggregated from other users.

11. The method of claim 7, wherein assigning one of the plurality of pre-defined data usage states comprises assigning each of the plurality of transport types to one or more of the following pre-defined data usage states: on track, off track, over limit, and under track.

12. The method of claim 7, further comprising generating the current data usage statistics by receiving data corresponding to at least a portion of the data usage statistics from a mobile operator and/or one or more of a plurality of computing devices of the user.

13. The method of claim 7, wherein comparing the accessed current data usage statistics to each of the data usage patterns comprises comparing the accessed current data usage statistics to threshold values associated with each of a plurality of network connections of at least one computing device of a user, the comparison determining network data consumption remaining for each of the plurality of network connections.

14. The method of claim 13, wherein the threshold values are defined in the data usage plan.

15. The method of claim 13, further comprising calculating remaining network data consumption based on the comparison.

16. The method of claim 7, further comprising predicting future network data consumption by the computing device based on the comparison.

17. One or more computer storage media embodying computer-executable components, said components comprising:
   a collection component that when executed causes at least one processor to access current data usage statistics for a user, the current data usage statistics representing network data consumed during a portion of a current billing cycle by at least one computing device of the user, the collection component further accessing a data usage pattern associated with the user;
   a user interface component that when executed causes the at least one processor to display the data usage pattern as an interactive curve with the data usage statistics displayed relative thereto, the user interface component further receiving from the user an input to interactively modify the data usage pattern represented by the interactive curve for the remaining period of the same current billing cycle; and
   a prediction component that when executed causes the at least one processor to assign the user to one of a plurality of pre-defined data usage states based on a comparison between the current data usage statistics and the adjusted data usage pattern; and
   wherein the user interface component, when executed, further causes the at least one processor to update the interactive curve displayed to the user with the adjusted data usage pattern.

18. The computer storage media of claim 17, wherein the prediction component further compares the current data usage statistics to the adjusted data usage pattern.

19. The computer storage media of claim 17, wherein the user interface component further displays to the user the assigned one of the plurality of pre-defined data usage states.

20. The computer storage media of claim 17, wherein the data usage pattern represents network data consumption for one of a plurality of network connections of the computing device.

* * * * *